No. 834,473. PATENTED OCT. 30, 1906.
I. HOGELAND.
NOISELESS CAR WHEEL.
APPLICATION FILED MAR. 16, 1905.

2 SHEETS—SHEET 1.

Witness
C. G. Hoen
N. H. Allemong

Inventor
Israel Hogeland.
By W. H. Lockwood.
Attorney

No. 834,473. PATENTED OCT. 30, 1906.
I. HOGELAND.
NOISELESS CAR WHEEL.
APPLICATION FILED MAR. 16, 1905.

2 SHEETS—SHEET 2.

UNITED STATES PATENT OFFICE.

ISRAEL HOGELAND, OF INDIANAPOLIS, INDIANA, ASSIGNOR OF ONE-HALF TO ERNEST L. PRATHNER, OF INDIANAPOLIS, INDIANA.

NOISELESS CAR-WHEEL.

No. 834,473.  Specification of Letters Patent.  Patented Oct. 30, 1906.

Application filed March 16, 1905. Serial No. 250,417.

*To all whom it may concern:*

Be it known that I, ISRAEL HOGELAND, of Indianapolis, county of Marion, and State of Indiana, have invented a certain new and useful Noiseless Car-Wheel; and I do hereby declare that the following is a full, clear, and exact description thereof, reference being had to the accompanying drawings, in which like numerals refer to like parts.

The object of this invention is to improve the construction of a car-wheel formed of a center or body portion, a tire or rim portion, an intervening substance which prevents the transmission of the vibrations of the tire to the center of the wheel, the axle, and the car-body.

The invention consists in the particular wheel and the method of making the same. The intervening material, as herein provided, is a layer of paper previously formed with a series of offsets, as herein shown, and circular, so that it will fit in place on the center or body portion of the wheel, and is formed from one continuous piece transversely of the wheel and extends the full width of the wheel.

Another feature consists in drawing the tire and body portion of the wheel together after the packing has been put in place by threaded bolts until they are clamped tightly, and then when drawn to the limit, the bolts are moved singly and permanent rivets substituted.

The various features of the invention will be understood from the following description and claim and the accompanying drawings.

Figure 1:
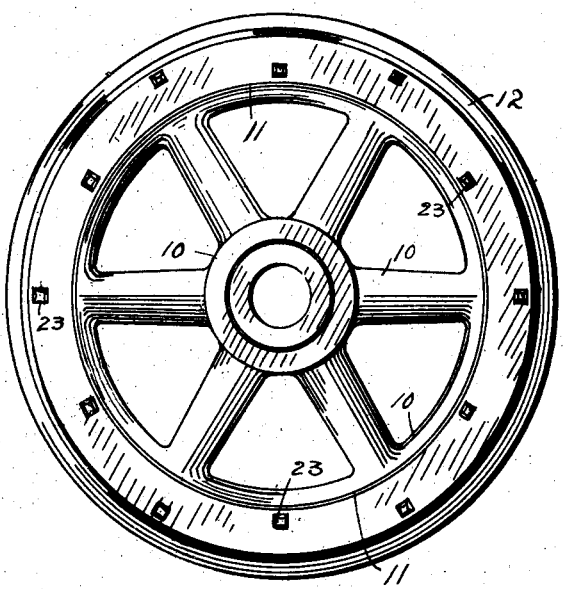
Figure 2:
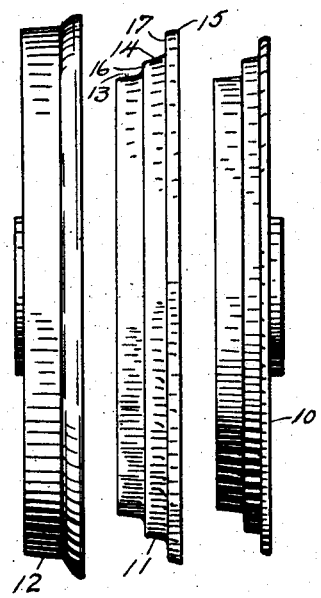
Figure 3:
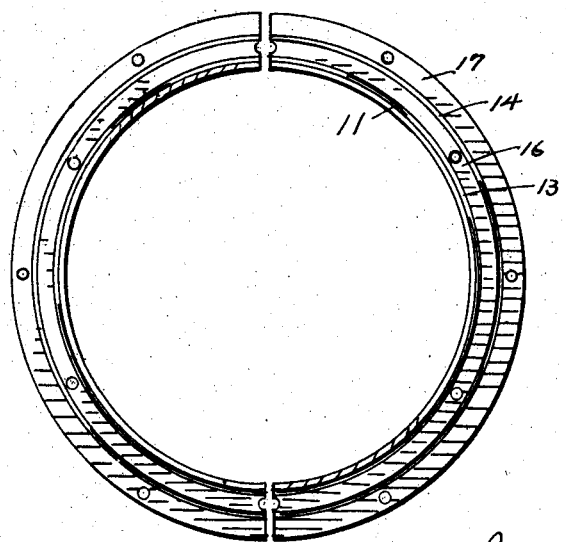
Figure 4:
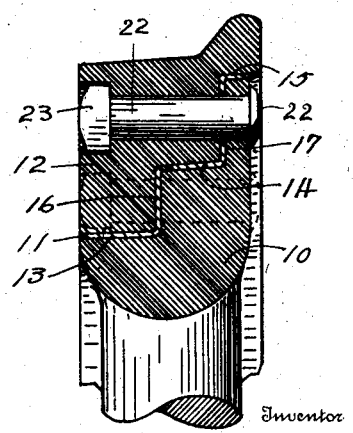
Figure 5:
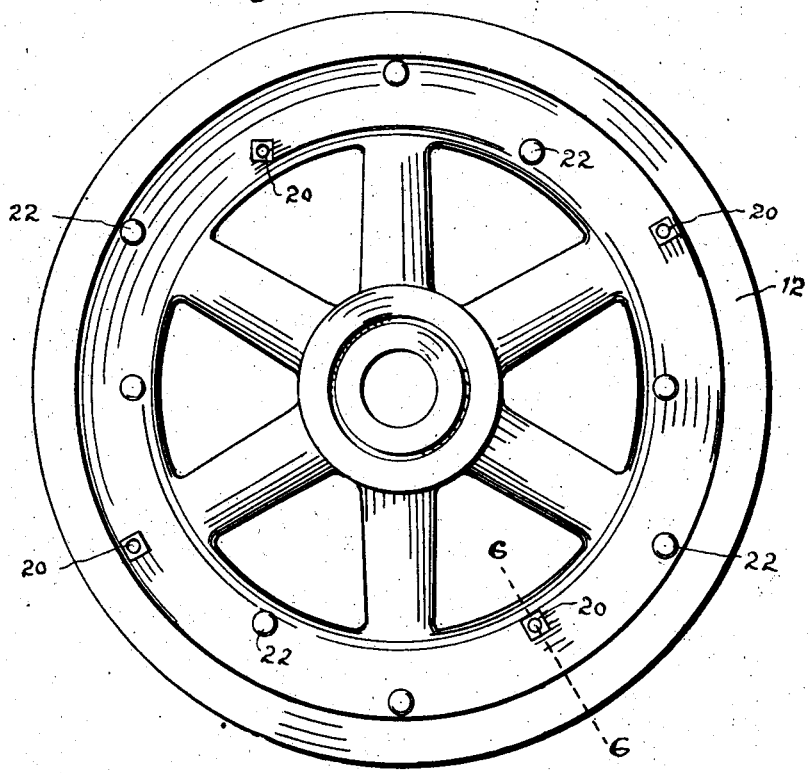
Figure 6:
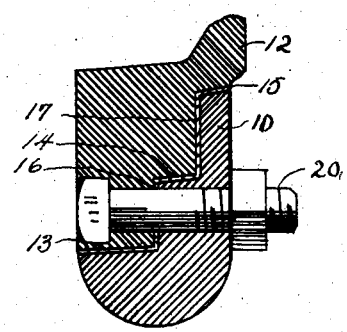

In the drawings, Figure 1 is an elevation of the inner side of the car-wheel. Fig. 2 is a plan view of the three parts of the car-wheel separate ready to be put together. Fig. 3 is an elevation of the packing-strips looking at the right-hand side as shown in the middle of Fig. 2. Fig. 4 is a section of the wheel on the line 4 4 of Fig. 1. Fig. 5 is a plan view of the wheel in process of construction, showing a part of the clamping-bolts still in place and a part substituted by rivets. Fig. 6 is a section on the line 6 6 of Fig. 5.

In detail, 10 is the center of the car-wheel, 11 the packing, and 12 the tire. The center is provided with two offsets in the periphery thereof, forming practically three steps 13, 14, and 15, and five surfaces at right angles to each other, the radial surfaces 16 and 17 in addition to the three steps referred to. Therefore the periphery of the center or body portion is formed with these five surfaces on its periphery, each at a right angle to the other successively. This provides the periphery of the center of the wheel with two radially-extending flanges, one thicker than the other and one extending beyond the other, as seen in Fig. 4. Through both of these flanges holes are made for bolts and rivets. These holes alternate in the two flanges and are cored in casting, and the body portion is cast in the form that has just been described. The tire is similarly formed along its inner surface, so as to fit the periphery of the center of the wheel substantially. This rim may be made of cast-steel or of rolled steel, preferably the latter, and is provided with holes in it to register with the holes in the flanges, and the holes in the tire extend alternately through what may be termed "two flanges" therein, as seen in Fig. 4. The outer end of each hole in the tire is enlarged and squared, whereas the main portion of the hole is round.

The packing 11 is formed of paper or similar fibrous material that is first pressed into shape both transversely and annularly of the wheel, as shown in Figs. 2 and 3. This is formed, preferably, of two semicircular parts, as seen in Fig. 3, so that they may be drawn more tightly into place in the wheel when formed. This packing is formed by using a wheel as a die. In other words, the packing in a compressible condition is placed on the rim of the center portion and then the tire is clamped into place on the packing, and in that way, with one wheel as a die, a large number of packing-strips are made and formed so that they may be used subsequently in making wheels, and they will preserve their shape until such use, and by being semicircular they can be nested for shipping and handling. Therefore it is seen that the three parts of this wheel may be separately shipped to railroads or other consumers or users and at the point of use may be combined, as will now be explained.

At the point of use the three parts of the wheel, as shown in Fig. 2, are placed together by hand, and then threaded bolts 20 are inserted through a number of the holes in the center portion and tire of the wheel and the nuts turned on them until the parts of the wheel are drawn to their limit or final position. Then the bolts are separately removed, and in place of each separate bolt, while the remaining bolts are holding the parts tightly in position, a rivet 22 is substituted. The rivet has a square head 23, adapted to fit in the cored depression in the tire heretofore referred to, so as to prevent the rivet from turning while the car-wheel is afterward under use or strain. The other end of the rivet is formed to be beaten down into the condition shown in Figs. 4 and 5, as rivets are usually formed. Both ends of the rivets are sunken, the square head 23 in the square depression referred to and the battered end of the rivet is protected by the tire of the wheel being made slightly wider than the center thereof, as seen in Figs. 3 and 4. When all of the bolts have been thus replaced by rivets the wheel is complete and securely united.

It is observed that the packing is transversely continuous and runs to the extreme edge on each side of the center or body portion of the wheel, and that there is no chance for play between the parts, and that even the rivets are held from turning or having any movement whatever, and the offsets between the two sections of the wheel, as is observed, are made slightly tapering, so that the tight fit and friction between the five surfaces of the periphery of the center, the packing, and the inner surface of the tire is so great that the rivets are largely relieved from strain while the car-wheel is in use.

What I claim as my invention, and desire to secure by Letters Patent, is—

The process of making a car-wheel which consists; first, in forming a center portion with a stepped periphery; second, forming a tire portion with its inner surfaces corresponding with the periphery of said center portion so that the corresponding surfaces of said wheel portions will mate with each other; third, forming packing to fit between the mating surfaces of said center and tire portions; fourth, clamping the wheel portions together with the packing in place by threaded bolts or other removable means; fifth, inserting rivets through said parts for permanently holding them together; and sixth, removing said bolts or other removable clamping means.

In witness whereof I have hereunto affixed my signature in the presence of the witnesses herein named.

ISRAEL HOGELAND.

Witnesses:
W. H. BONHAM,
N. ALLEMONG.